(12) United States Patent
Lee

(10) Patent No.: US 7,050,937 B2
(45) Date of Patent: May 23, 2006

(54) PERFORMANCE MEASUREMENT SYSTEM

(75) Inventor: Sang-in Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 76 days.

(21) Appl. No.: 10/791,808

(22) Filed: Mar. 4, 2004

(65) Prior Publication Data

US 2005/0027479 A1 Feb. 3, 2005

(30) Foreign Application Priority Data

Jul. 18, 2003 (KR) .................... 10-2003-0049307

(51) Int. Cl.
*G06F 19/00* (2006.01)
(52) U.S. Cl. .................... 702/182; 702/94; 702/152; 700/56; 700/108
(58) Field of Classification Search ................ 702/94, 702/95, 150, 152, 182; 700/56, 108, 174, 700/180, 192, 245, 251; 33/503, 504, 505; 901/6
See application file for complete search history.

(56) References Cited

U.S. PATENT DOCUMENTS

| | | | |
|---|---|---|---|
| 5,079,707 A * | 1/1992 | Bird et al. ................ | 701/35 |
| 5,115,407 A * | 5/1992 | Bird et al. ................ | 702/121 |
| 5,788,084 A | 8/1998 | Onishi et al. | |
| 5,949,685 A * | 9/1999 | Greenwood et al. ........ | 700/193 |
| 6,051,805 A * | 4/2000 | Vaidya et al. .......... | 219/130.01 |
| 6,259,969 B1 | 7/2001 | Tackett et al. | |
| 6,321,137 B1 * | 11/2001 | De Smet ................. | 700/245 |
| 6,532,401 B1 | 3/2003 | Tackett et al. | |

(Continued)

FOREIGN PATENT DOCUMENTS

JP 60-35210 2/1985

(Continued)

OTHER PUBLICATIONS

Internet Web page at www.krypton.be/iso_roboscope.html, entitled: "Robot test software for performance standards", date unknown.*

(Continued)

*Primary Examiner*—Patrick J. Assouad
(74) *Attorney, Agent, or Firm*—Staas & Halsey LLP

(57) ABSTRACT

A performance test system includes a measuring device to measure an object device, and a computing device having a controller to test performance of the object device based on measured data transmitted from the measuring device, wherein the controller controls to display a report setup window through which data to be reflected in a measurement report is inputted, a coordinate-system setup window through which a coordinate system is set up based on the object device, and a measuring option setup window through which options for measuring the performance of the object device are set up, controls operation of the measuring device and the object device based on the options set up through the measuring option setup window, and tests the performance of the object device based on the measured data transmitted from the measuring device according to the operation of the object device and the measuring device, and controls to display a report window to process and to output report data inputted through the report setup window and the measured data transmitted from the measuring device. The present invention provides a performance measurement system, in which performance of an object device is measured, the performance measurement is reported with measured data and various report data, and an interface convenient for a user is provided.

36 Claims, 15 Drawing Sheets

U.S. PATENT DOCUMENTS

| | | | |
|---|---|---|---|
| 6,571,148 B1 * | 5/2003 | Wunder | 700/175 |
| 6,640,607 B1 * | 11/2003 | Abbe | 73/1.01 |
| 6,681,145 B1 * | 1/2004 | Greenwood et al. | 700/193 |
| 6,721,675 B1 * | 4/2004 | Chawla | 702/105 |
| 6,735,494 B1 * | 5/2004 | Wunder | 700/175 |
| 6,748,790 B1 * | 6/2004 | Abbe | 73/1.79 |
| 6,847,908 B1 * | 1/2005 | Chawla | 702/105 |
| 2002/0148275 A1 * | 10/2002 | Abbe | 73/1.01 |
| 2002/0189319 A1 * | 12/2002 | Abbe | 73/1.01 |
| 2003/0097232 A1 * | 5/2003 | McClendon et al. | 702/114 |
| 2003/0200042 A1 * | 10/2003 | Gan et al. | 702/105 |
| 2004/0153273 A1 * | 8/2004 | Chawla | 702/94 |
| 2004/0215410 A1 * | 10/2004 | Siegers et al. | 702/84 |

FOREIGN PATENT DOCUMENTS

| | | |
|---|---|---|
| JP | 4-198755 | 7/1992 |
| JP | 8-137531 | 5/1996 |
| JP | 2002-008179 | 1/2002 |
| JP | 2002-208956 | 7/2002 |
| KR | 1996-136342 | 6/1996 |
| KR | 10-206644 | 7/1999 |
| KR | 2001-13719 | 2/2001 |
| KR | 10-306438 | 8/2001 |

OTHER PUBLICATIONS

Internet Web page at www.klsrobotics.com/performance_testing.cfm, entitled: "The Value of Robot Performance Testing", date unknown.*

Internet Web page at www.dynalog-us.com/solutions/?CategoryID=2&cID=7 entitled "CompuGauge", date unknown.*

ISO 9283 International Standard for Manipulating industrial robots—Performance criteria and related test methods, Second Ed. 1998.

Korean Intellectual Property Office Notice of Official Action for corresponding Korean Patent Application No. 10-2003-0049307.

* cited by examiner

FIG. 13

Robot Performance Measurement [ISO 9283]

[ Exchangeability ]

Date : 2003-04-07

1. Measurement Information a. Type            :
b. Model           :
c. Manufacturer    : Samsung
d. Robot Serial Number :
e. Main Software Version :
f. BSC Software Version :
g. Measurement System :
h. Measured Date   : 2003/04/06  22:09:51
i. Operrator       : Lee . S . I j. σ Quality    4.0
k. DPMO         6209.7
l. Result       PASS

2. Measurement Result

| P1[E] | R1 | R2    | R3    | R4    | R5    | 비 고 |
|-------|----|-------|-------|-------|-------|------|
| R1    | -  | 0.016 | 0.013 | 0.004 | 0.008 |      |
| R2    | -  | -     | 0.026 | 0.018 | 0.007 |      |
| R3    | -  | -     | -     | 0.010 | 0.020 |      |
| R4    | -  | -     | -     | -     | 0.011 |      |
| R5    | -  | -     | -     | -     | -     |      | a. Load              : 100 %
b. Override Speed    : 100 %
c. CP Speed          : 500 mm/sec
d. Specified Limit   : E Low : -0.11  E High : 0.12
e. Number of Poses   : 5
f. Measurement Cycle : 10
g. Measurement Frequency : 500 Hz

3. Additional Notes

FIG. 14
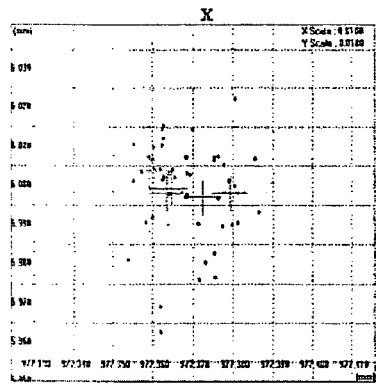
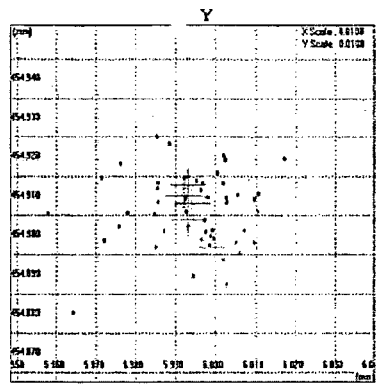
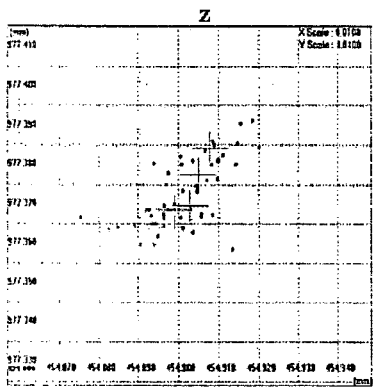

PERFORMANCE MEASUREMENT SYSTEM

CROSS-REFERENCE TO RELATED APPLICATIONS

This application claims the benefit of Korean Patent Application No. 2003-49307, filed on Jul. 18, 2003, in the Korean Intellectual Property Office, the disclosure of which is incorporated herein by reference.

BACKGROUND OF THE INVENTION

1. Field of the Invention

The present invention relates to a performance measurement system, and more particularly, to a performance measurement system, in which a performance of an object device is measured, the performance measurement is reported with measured data and various report data, and an interface convenient for a user is also provided.

2. Description of the Related Art

Recently, in tandem with factory automation, a robot plays various roles in a production line and grows in importance. Accordingly, since the robot is widely used, its flexibility and reliability are required, and therefore a performance measurement system is also important to verify the flexibility and the reliability of the robot.

Such a performance measurement system is important to a manufacturer or a user as a verifying system for quality test, performance improvement, and an application of the robot.

Generally, the performance measurement system comprises a measuring device to measure the performance of an object device such as the robot or the like, and a computing device controlling operation of the measuring device including a performance test program to test the performance of the object device based on measured data received from the measuring device.

It is necessary for the performance test program included in the computing device to offer an interface convenient for a user, which reports the performance measurement based on the measured data received from the measuring device and tests the performance of the object device, simultaneously, and reports the performance test reflecting items selected by a user.

SUMMARY OF THE INVENTION

Accordingly, it is an aspect of the present invention to provide a performance measurement system, in which performance of an object device is measured, the performance measurement is reported with measured data and various report data, and an interface convenient for a user is provided.

Additional aspects and advantages of the invention will be set forth in part in the description which follows and, in part, will be obvious from the description, or may be learned by practice of the invention.

The foregoing and/or other aspects of the present invention are achieved by providing a performance test system comprising a measuring device to measure an object device, and a computing device having a controller to test performance of the object device based on the measured data transmitted from the measuring device, wherein the controller controls to display a report setup window through which data to be reflected in a measurement report is inputted, a coordinate-system setup window through which a coordinate system is set up based on the object device, and a measuring option setup window through which options for measuring the performance of the object device are set up, controls operation of the measuring device and the object device based on the options set up through the measuring option setup window, and tests the performance of the object device based on the measured data transmitted from the measuring device according to the operation of the object device and the measuring device, and controls to display a report window to process and to output report data inputted through the report setup window and the measured data transmitted from the measuring device.

According to an aspect of the invention, the controller controls to display a device registration window through which information on the object device is inputted.

According to an aspect of the invention, the device registration window comprises a configuration window through which configuration information such as a type and a model name of the object device is registered, and a specification window through which specification information according to the types and the model names of the object device based on the configuration information of the object device is registered.

According to an aspect of the invention, the configuration window comprises a selection field having a plurality of selection buttons, and data input sheets displayed when the selection button is clicked.

According to an aspect of the invention, the specification window comprises a device selection field having a type selection combo box through which one of the types of the objective device registered through the configuration window is selected, and a model selection combo box through which the model names of the object device registered through the configuration window is selected, a specification registration field having at least one test item selection button corresponding to test items, and a specification input box being displayed when the test item selection button is selected and through which the specification information on the test item corresponding to the selected test item selection button is inputted.

According to an aspect of the invention, the controller controls the measuring device to obtain coordinate values corresponding to first, second and third points to define a seating plane on which the object device is located, and to obtain coordinate values to set up the coordinate system based on the object device.

According to an aspect of the invention, the coordinate-system setup window comprises a coordinate-system setup field having first, second and third point option buttons corresponding to the respective first, second and third points, and a measure button to issue a control command to the measuring device to find the coordinate value of the point corresponding to selected one of the first, second and third point option buttons.

According to an aspect of the invention, the coordinate-system setup field further comprises coordinate-system setup option buttons corresponding to coordinate values to set up the coordinate system based on the object device, and coordinate input boxes corresponding to the respective coordinate-system setup option buttons through which the coordinate values based on the object device are inputted, and the controller controls the measuring device to obtain the coordinate value of the point corresponding to the selected coordinate-system setup option button when a user selects one of the coordinate-system setup option buttons and clicks the measure button.

According to an aspect of the invention, the controller sets up the coordinate system based on the object device on the basis of the coordinate values inputted through the coordinate input boxes and the coordinate values obtained to define the coordinate system based on the object device.

According to an aspect of the invention, the coordinate-system setup window further comprises a coordinate display field having a first display sheet to display the coordinate values controlled through the coordinate-system setup field and inputted from the measuring device as the coordinate values corresponding to the coordinate system based on the measuring device, and a second display sheet to display the coordinate values displayed on the first display sheet as the coordinate values corresponding to the coordinate system based on the object device.

According to an aspect of the invention, the coordinate-system setup window further comprises a rotation translation field having an axis selection button to select an axis about which the coordinate system is rotated, and a rotation angle input box through which a rotation angle is inputted, wherein the controller rotates the coordinate system set up through the coordinate-system setup field about an axis selected through the axis selection button axis at an angle inputted through the rotation angle input box.

According to an aspect of the invention, the measuring option setup window comprises a network setup field to set up a network between the computing device and the object device, a device configuration setup field to set up operating configuration of the object device reflected in the performance measurement of the object device, and a measuring option setup field including a test item check box corresponding to at least one of test items, a measuring sequence input box to prioritize the test items checked through the test item check box, and a measuring cycle input box to input the number of measuring times for the test items checked through the test item check box.

According to an aspect of the invention, the report window comprises a report main window having a report selection menu corresponding at least one test item, and a plurality of report displaying windows to be accessed based on the selected report selection menu.

According to an aspect of the invention, the report main window comprises a coordinate translation menu to access a coordinate translation window, the coordinate translation window having a coordinate translation button to translate the measured data transmitted from the measuring device into the coordinate values corresponding to the coordinate system based on the object device set up through the coordinate-system setup window.

According to an aspect of the invention, each of the report displaying windows comprises a report display field processing and displaying the measured data transmitted from the measuring device, and an output field having a print button to print the measurement report reflecting the report data inputted through the report setup window and the measured data transmitted from the measuring device, and a storing button to store the report data inputted through the report setup window and the measured data transmitted from the measuring device as a predetermined file.

According to an aspect of the invention, the controller comprises a performance test program based on an operating system of the computing device.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 13 and 14 exemplarily illustrate measurement reports according to an embodiment of the present invention.

DETAILED DESCRIPTION OF THE PREFERRED EMBODIMENTS

Figure 1:
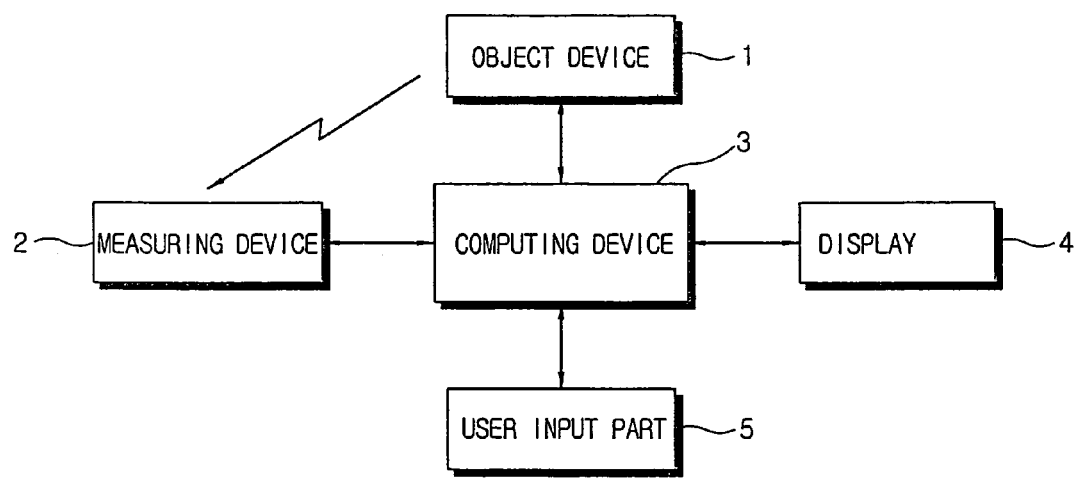
FIG. 1 is a block diagram of a performance measurement system according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

In FIG. 1, a performance measurement system according to the present invention comprises a measuring device 2 to measure performance of an object device 1 such as a robot or the like, a computing device 3 which controls an operation of the measuring device 2 and comprises a controller (not shown) to test and to report the performance of the object device 1 based on the measured data received from the measuring device 2, simultaneously, a display 4 electrically connected to the computing device 3 and displaying a picture, and a user input part 5 through which a user inputs test and report data corresponding to the performance of the object device.

The measuring device 2, e.g., a laser tracker, obtains coordinate values corresponding to a specific point or movement of the object device 1, and transmits the coordinate values to the computing device 3.

The computing device 3 stores, computes and processes the test and report data inputted through the user input part 5 and the measured data received from the measuring device 2, thereby testing the performance of the object device 1. The controller according to the present invention is a performance test program based on an operating system of the computing device 3, by way of example.

Herein below, a process of measuring the performance of the object device 1 by the performance measurement system according to the present invention will be described with reference to FIGS. 2–10.

Figure 2:
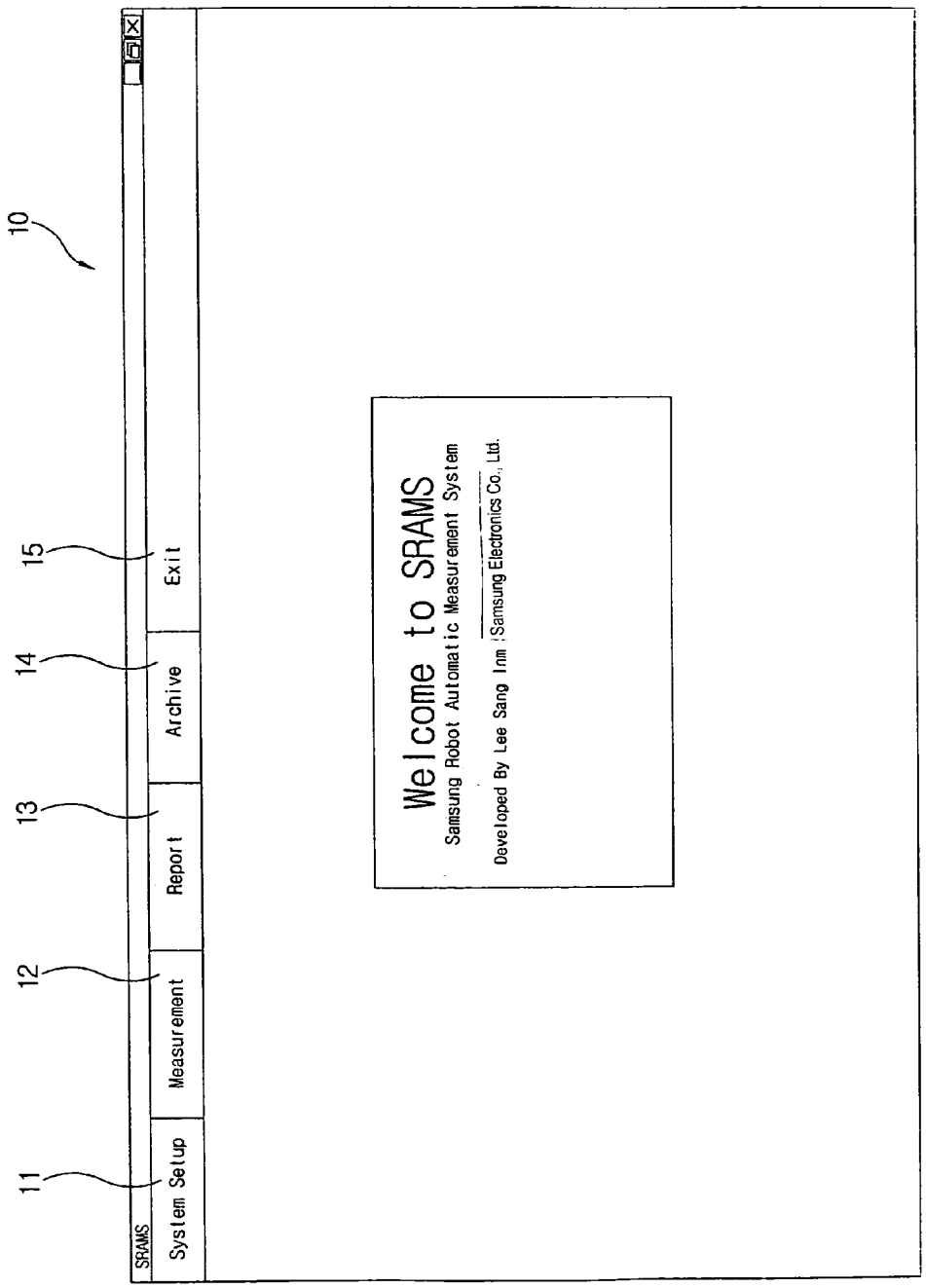
FIG. 2 illustrates a performance test main window according to an embodiment of the present invention.

First, the performance test program installed in the computing device 3 is executed, so that a performance test main window 10 is displayed on the display 4 as shown in FIG. 2. The performance test main window 10 comprises a system setup button 11 to access a device registration window through which information on the object device 1 is inputted, a measurement menu 12 to access windows for measuring performance of the object device 1, and a report menu 13 to access a report window on which the performance measurement of the object device 1 is reported. Further, the performance test main window 10 further comprises an archive menu 14 to access data corresponding to the performance measurement, e.g., driving data of the performance test program according to the present invention, and an exit menu 15 to exit from the performance test program.

When the system setup button 11 is clicked, the performance test program allows the device registration window through which the information on the object device 1 is inputted to be displayed on the display 4. Referring to FIGS. 3–7, the device registration window comprises a configuration window 20 through which configuration information including types and model names of the object device 1 is registered, and a specification window 30 through which specification information according to the types and the model names of the object device 1 is registered. Here, the system setup button 11 displays a drop down list. Therefore, when the system setup button 11 is clicked, a button to access the configuration window 20 and a button to access the specification window 30 are displayed.

Figure 3:
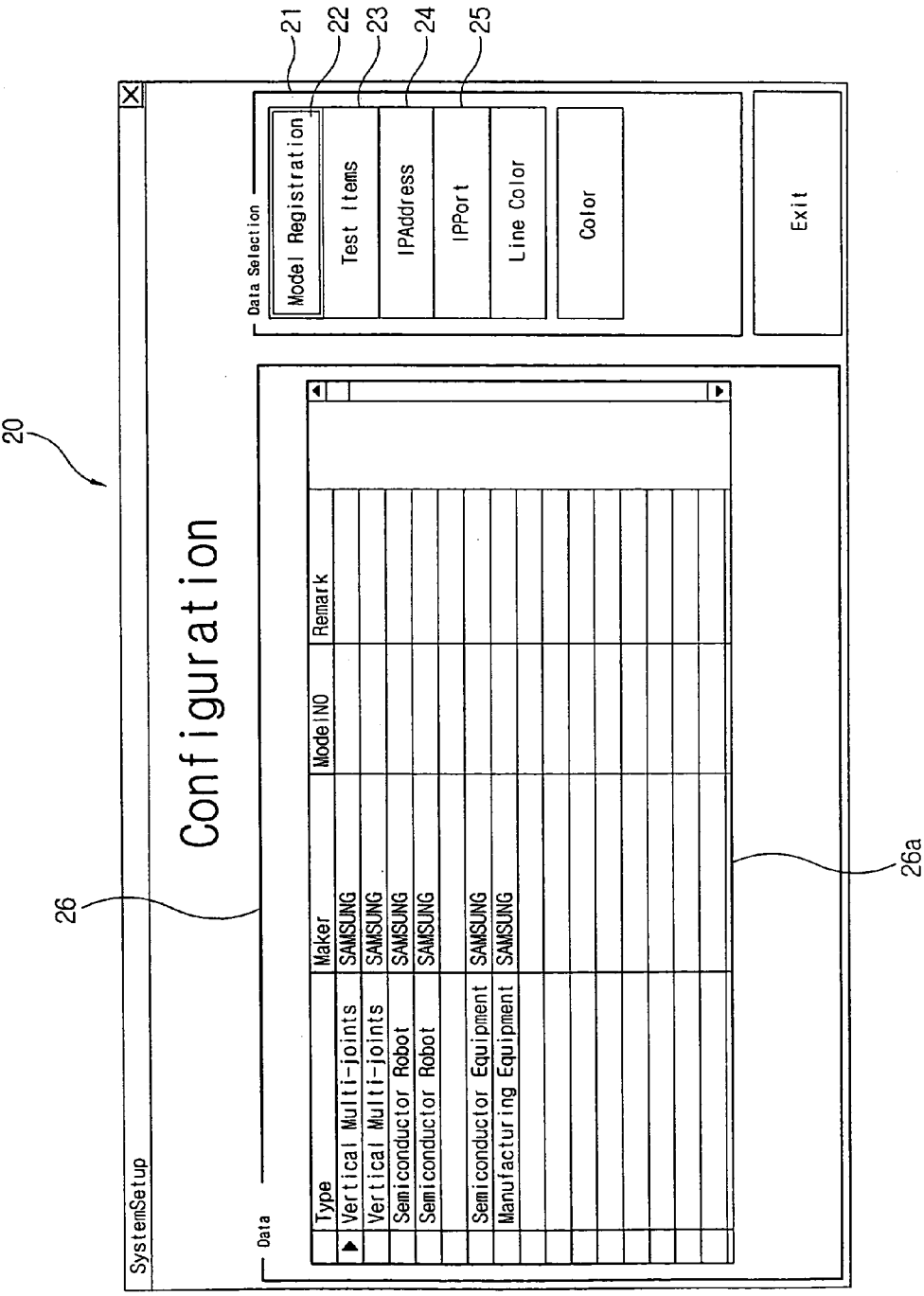
FIGS. 3 through 6 illustrate configuration windows according to an embodiment of the present invention.

The configuration window 20, as shown in FIGS. 3–6, comprises a selection field having a plurality of selection buttons 22, 23, 24 and 25, and an input field 26 having data input sheets 26a, 26b, 26c and 26d displayed when the selection buttons 22, 23, 24 and 25 are clicked. Here, the plurality of selection buttons 22, 23, 24 and 25 comprise a model registration button 22, a test item button 23, an IP (Internet protocol) address button 24, an IP port button 25, etc. When a user clicks the model registration button 22, as shown in FIG. 3, the data input sheet 26a is displayed in the input field 26, thereby allowing a user to input the configuration information such as the type, the model name, a model number or the like of the object device 1 by means of the data input sheet 26a.

Figure 4:
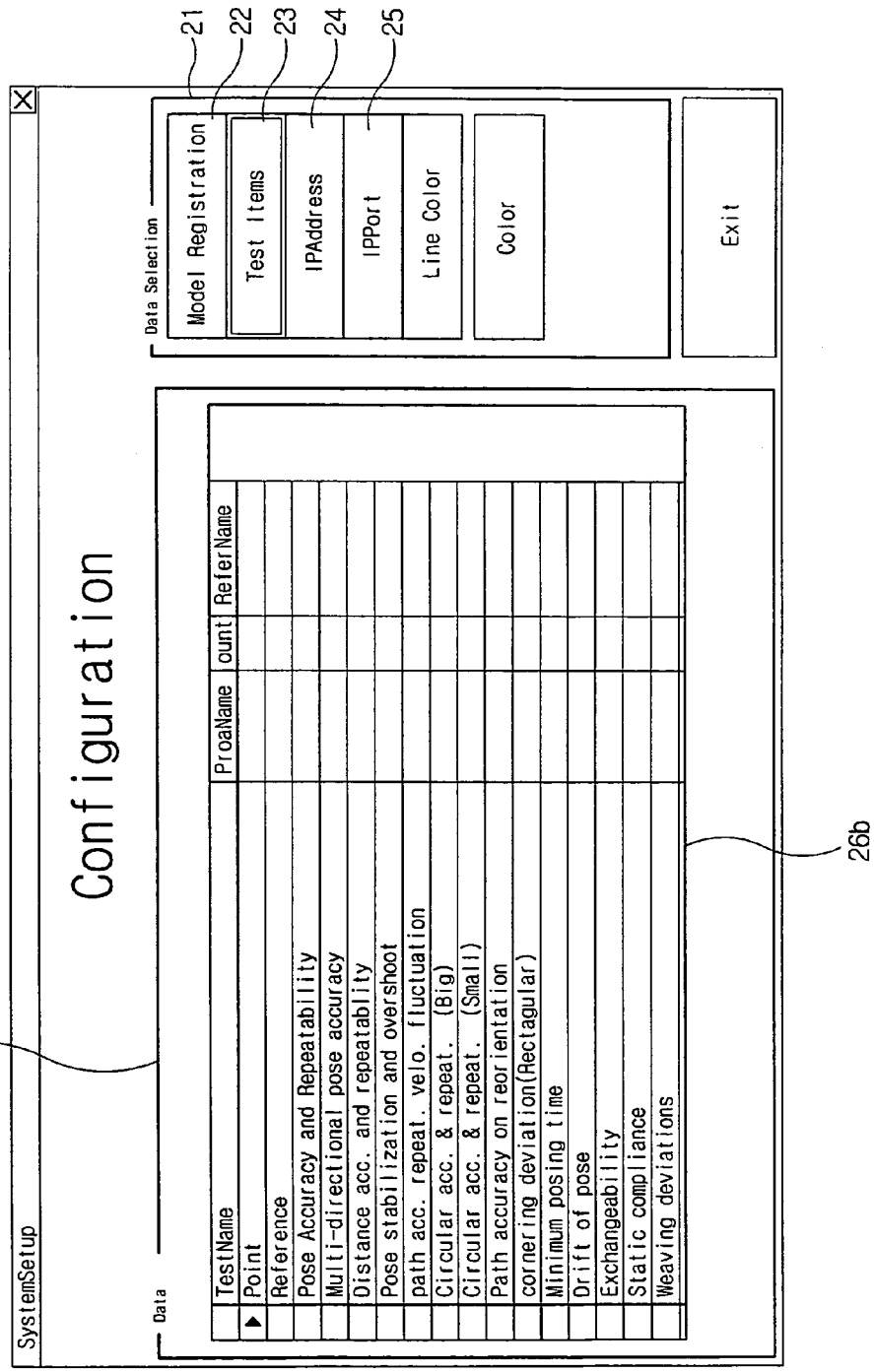

When a user clicks the test item button 23, as shown in FIG. 4, the data input sheet 26b showing test items for the object device 1 is displayed in the input field 26. Here, the test items of the data input sheet 26b displayed in the input field 26 may be based on ISO (International Standardization Organization) 9283 standard, or be separately registered by a user. For example, the test items comprise at least one of "pose accuracy and repeatability", "multi-directional pose accuracy", "distance accuracy and repeatability", "pose stabilization time and over shoot", "exchangeability", "path accuracy and repeatability", "path velocity characteristics", "circular path accuracy and repeatability", "path accuracy on reorientation", "cornering deviations", and "minimum posing time".

Figure 5:
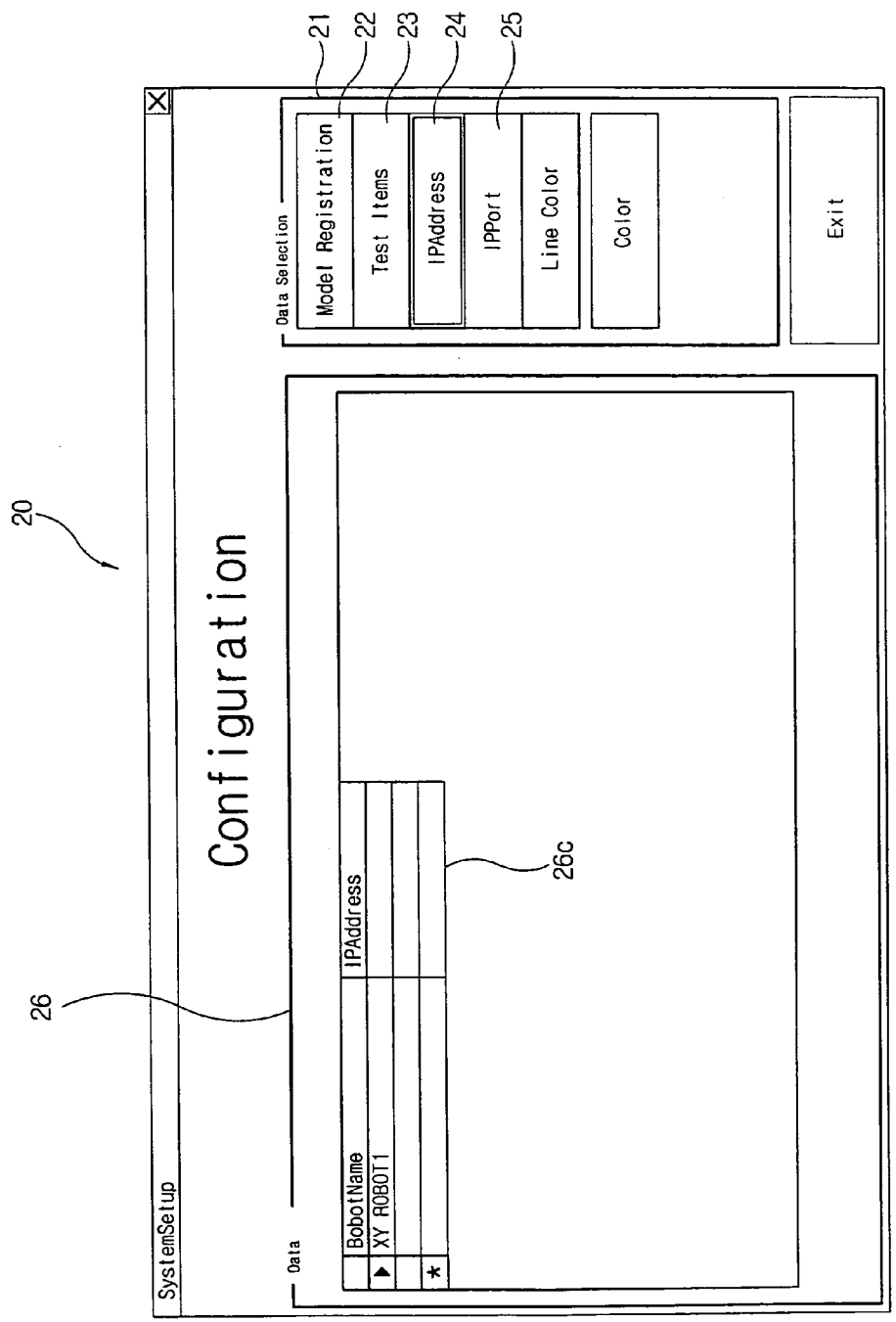

When a user clicks the IP address button 24, as shown in FIG. 5, the data input sheet 26c showing input lines for the model name and an IP address of the object device 1 is displayed in the input field 26.

Figure 6:
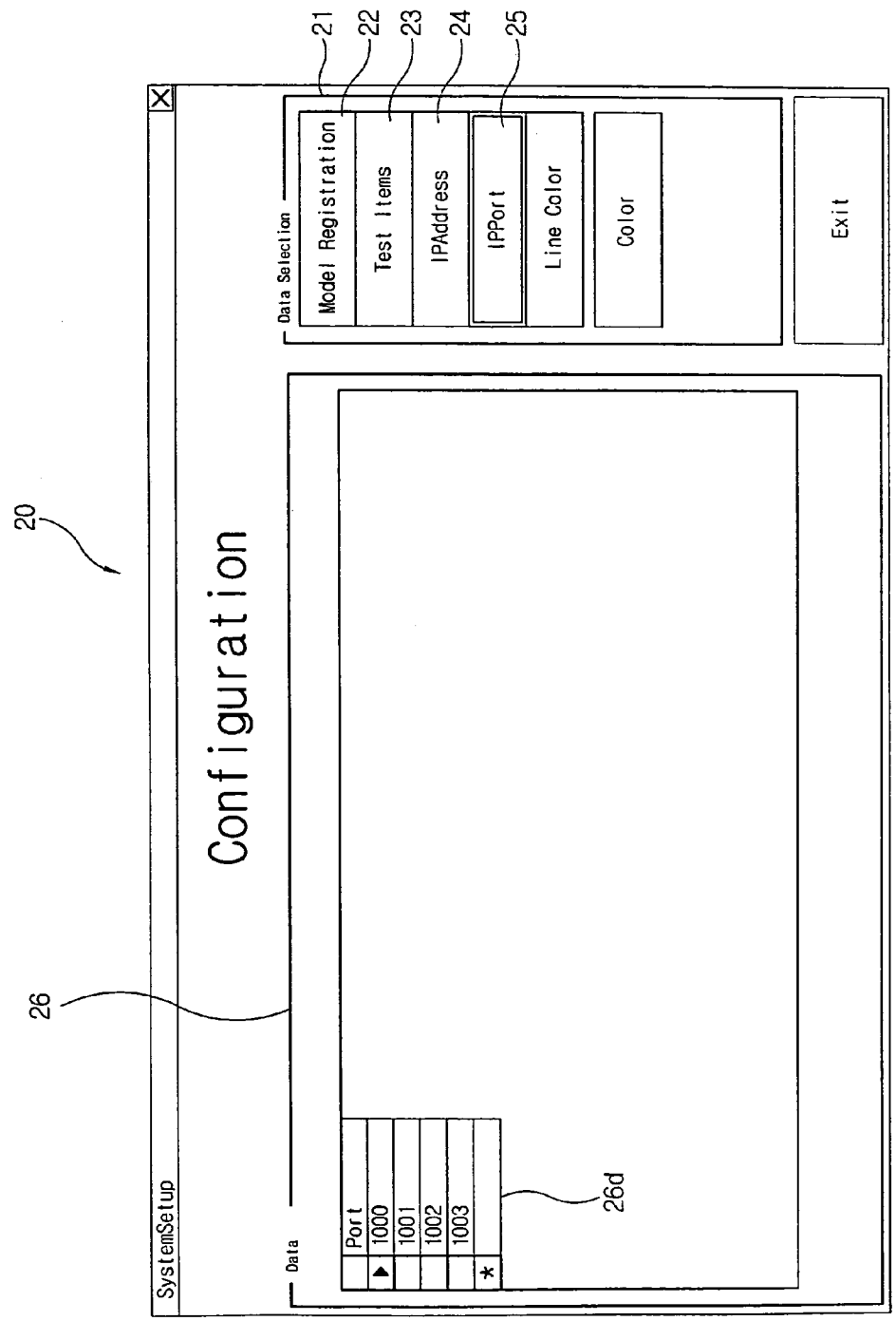

When a user clicks the IP port button 25, as shown in FIG. 6, the data input sheet 26d for inputting an IP port is displayed in the input field 26.

Figure 7:
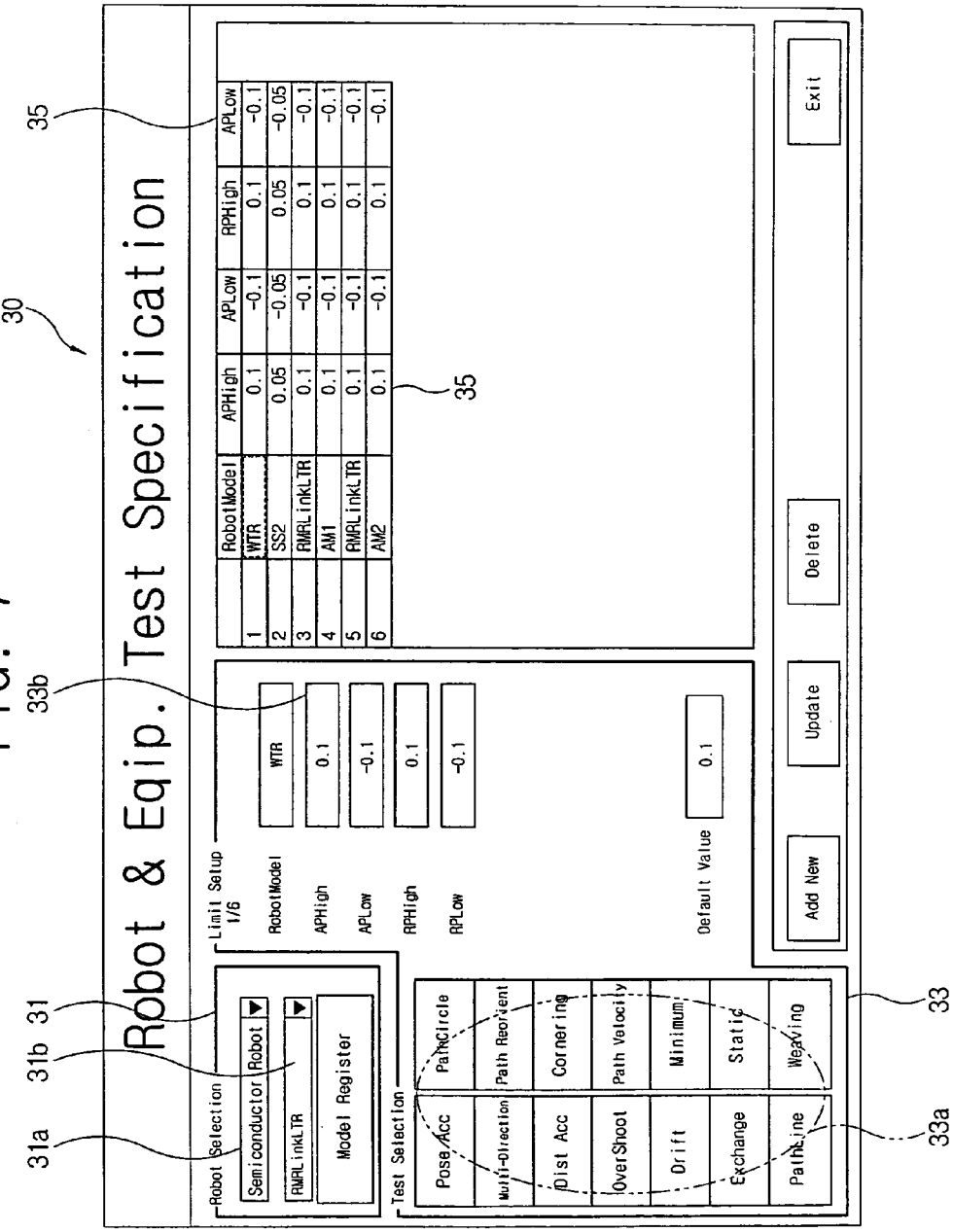
FIG. 7 illustrates a specification window according to an embodiment of the present invention.

The specification window 30, as shown in FIG. 7, comprises a device selection field 31 and a specification registration field 33.

The device selection field 31 comprises a type selection combo box 31a, and a model selection combo box 31b. The type selection combo box 31a and the model selection combo box 31b are respectively provided for selecting the type and the model name of the object device 1 of which the specification information is desired by a user to be inputted through the specification registration field 33. When an arrow button of the type selection combo box 31a is clicked, the types of the object device 1 registered through the configuration window 20 are displayed. Further, when the arrow button of the model selection combo box 31b is clicked, the model names of the object device 1 registered through the configuration window 20 are displayed. The model names of the object device 1 displayed in the model selection combo box 31b are limited to a subgroup of the type of the object device 1 selected through the type selection combo box 31a.

The specification registration field 33 comprises at least one test item selection button 33a, and a specification input box 33b. The number of test item selection buttons 33a correspond to the number of test items. The test items are previously registered through the configuration window 20. When one of the test item selection buttons 33a is selected, the specification input box 33b is displayed comprising the specification information on the test item corresponding to the selected test item selection button 33a. The specification information of the specification information input box 33b comprises a low or high value corresponding to accuracy and repeatability.

The specification window 30 further comprises a display sheet 35 on which the previously registered specification information on the model name of the object device 1 is shown, thereby preventing duplicate registration of the specification information corresponding to the same model name.

Meanwhile, in the performance test main window 10 shown in FIG. 2, the measurement menu 12 displays a drop down list. Therefore, when the measurement menu 12 is clicked, the following buttons are displayed: a button to access a report setup window 40 through which data to report the measurement is inputted, a button to access a coordinate-system setup window 50 through which a coordinate system is set up based on the object device 1, and a button to access a measuring option setup window 60 through which options for measuring the performance of the object device 1 are set up. Thus, when a user selects one of the buttons, the window corresponding to the selected button is displayed.

Figure 8:
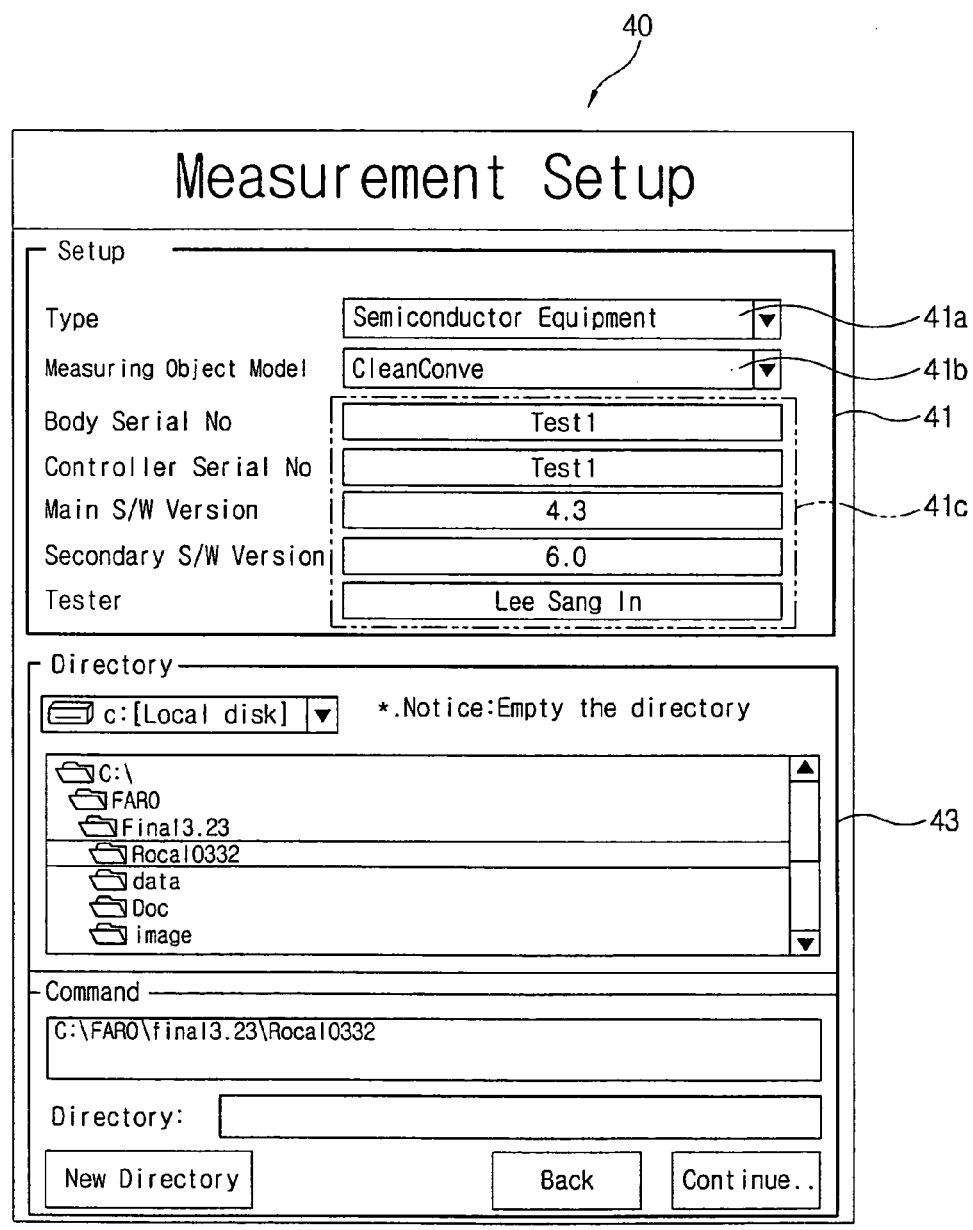
FIG. 8 illustrates a report setup window according to an embodiment of the present invention.

In the performance test main window 10, when the button to access the report setup window 40 is selected in the drop down list of the measurement menu 12, the performance test program displays the report setup window 40 on the display 4 as shown in FIG. 8. The report setup window 40 comprises a reporting data input field 41 through which reporting data to be reflected in the measurement report is inputted, and a directory specifying field 43 through which a directory to store the reporting data inputted through the reporting data input field 41 is specified.

The reporting data input field 41 comprises a type selection combo box 41a and a model selection combo box 41b to select the type and the model name of the object device 1. Further, the reporting data input field 41 may comprise a plurality of text boxes 41c through which various data such as information on the object device 1 reported in the measurement report, a reporter name, etc. are inputted. The information on the object device 1 reported in the measurement report may comprise an inherent serial number of the object device 1, a serial number of a controller to control the operation of the object device 1, and a software version of the controller for the object device 1.

The directory specifying field 43 is provided for specifying a directory in which the reporting data inputted through the reporting data input field 41 is stored as a file to be accessed by the performance test program.

The performance test program according to the present invention controls the measuring device 2 to obtain three coordinate values corresponding to first, second and third random points to define a seating plane on which the object device 1 is located. Further, the performance test program controls the measuring device 2 to obtain four coordinate values to set up the coordinate system based on the object device 1. Three or more coordinate values may be obtained to define the seating plane, and four or more coordinate values may be obtained to set up the coordinate system based on the object device 1. To obtain the coordinate values corresponding to the first second and third points and to set up the coordinate system based on the object device 1, the performance test program issues a control command to the object device 1 in response to the setup of a coordinate-system setup window 50 shown in FIG. 9.

Figure 9:
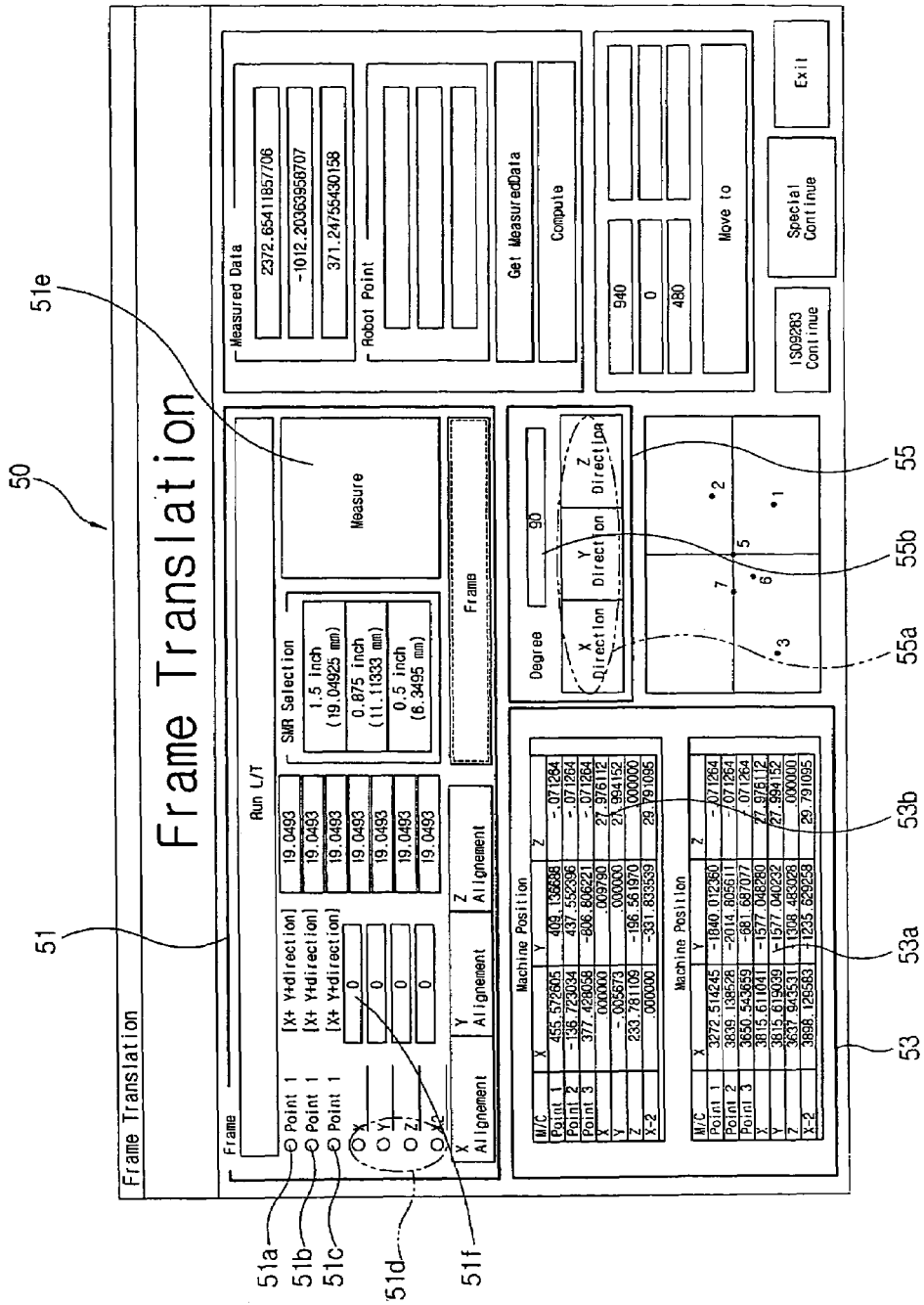
FIG. 9 illustrates a coordinate-system setup window according to an embodiment of the present invention.

In FIG. 9, the coordinate-system setup window 50 comprises a coordinate-system setup field 51 having first, second and third point option buttons 51a, 51b and 51c respectively corresponding to the first, second and third points, and a measure button 51e to issue the control command to the measuring device 2. Here, when a user selects one of the first, second and third point option buttons 51a, 51b and 51c and clicks the measure button 51e, the performance test program issues the control command to the measuring device 2 to obtain the coordinate value of the point corresponding to the selected option button. Thus, the performance measurement system according to the present invention determines a degree of the measured seating plane of the object device 1 defined based on three coordinate values is parallel with a predetermined reference plane. When the measured seating plane is inclined relative to the predetermined reference plane at a predetermined angle, the predetermined angle is reflected in the measured data of the object device 1 based on the coordinate values corresponding to the measured three points.

Further, the coordinate-system setup field 51 comprises coordinate-system setup option buttons 51d corresponding to four coordinate values to set up the coordinate system based on the object device 1, and coordinate input boxes 51f provided corresponding to the respective coordinate-system setup option buttons 51d and through which the coordinate values based on the object device 1 are inputted. Here, when a user selects one of the coordinate-system setup option buttons 51d and clicks the measure button 51e, the performance test program issues the control command to the measuring device 2 to obtain the coordinate value of the point corresponding to the selected option button 51d. At this time, the coordinate values obtained correspond to the coordinate system based on the measuring device 2 and the coordinate values inputted in the coordinate input boxes 51f correspond to the coordinate system based on the object device 1. Thus, four coordinate values corresponding to the coordinate system based on the measuring device 2 and four coordinate values corresponding to the coordinate system based on the object device 1 are obtained, so that a relative position between the coordinate system based on the measuring device 2 and the coordinate system based on the object device 1 is determined, setting up the coordinate system based on the object device 1.

Meanwhile, the coordinate-system setup window 50 further comprises a coordinate display field 53 having a first display sheet 53a to display the coordinate values controlled through the coordinate-system setup field 51 and inputted from the measuring device 2 as the coordinate values which correspond to the coordinate system based on the measuring device 2, and a second display sheet 53b to display the coordinate values displayed on the first display sheet 53a as the coordinate values which correspond to the coordinate system based on the object device 1.

Further, the coordinate-system setup window 50 comprises a rotation translation field 55 to rotate the coordinate system set up through the coordinate-system setup field 51 about a selected axis at a predetermined angle. The rotation translation field 55 comprises an axis selection button 55a to select an axis about which the coordinate system is rotated, and a rotation angle input box 55b through which a rotation angle is inputted.

The data measured or inputted through the coordinate-system setup window 50 is stored to the directory specified through the directory specifying field 43 (shown in FIG. 8) as a file to be accessed by the performance test program.

Figure 10:
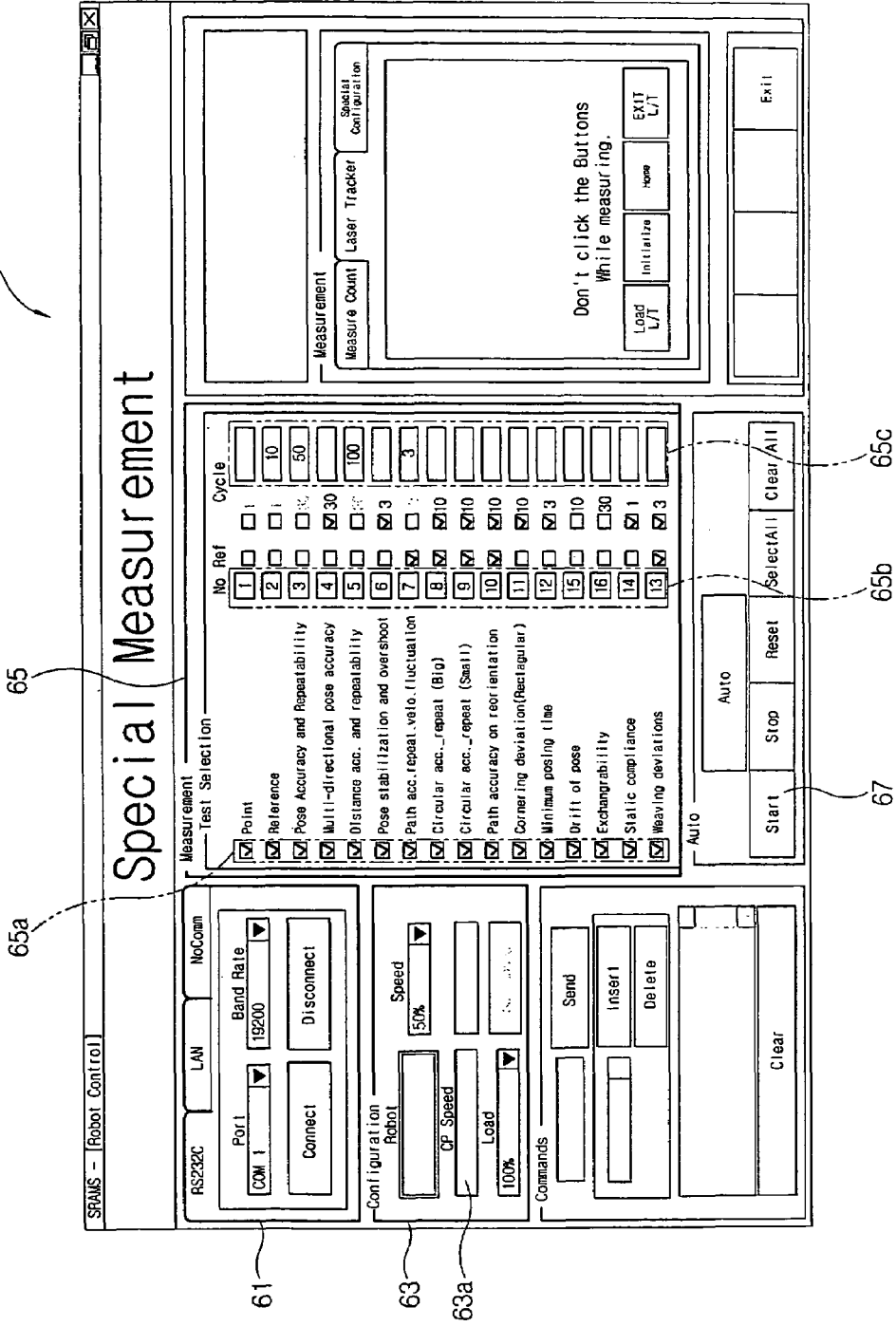
FIG. 10 illustrates a measuring option setup window according to an embodiment of the present invention.

In FIG. 10, the measuring option setup window 60 comprises a network setup field 61 to set up a network between the computing device 3 and the object device 1, a device configuration setup field 63 to set up operating configuration of the object device 1 reflected in the performance measurement of the object device 1, and a measuring option setup field 65 comprising test item check boxes 65a, measuring sequence input boxes 65b and measuring cycle input boxes 65c.

The network setup field 61 allows the network between the computing device 3 and the object device 1 to be set up by a user, in which the IP address or the IP port previously registered through the configuration window 20 is selected, or the IP address or the IP port can be separately inputted by a user.

The device configuration setup field 63 comprises a plurality of input boxes 63a to set up a motion speed of the object device 1, a reference speed reflected in the measurement report, and a load applied to the object device 1.

In the measuring option setup field 65, the test item check box 65a allows a user to select the test items for the object device 1 among the registered test items. Further, the measuring sequence input box 65b allows a user to prioritize the test items checked through the test item check boxes 65a. Further, the measuring cycle input box 65c allows a user to input the number of measuring times for the test items checked through the test item check boxes 65a. Thus, the performance measurement system according to the present invention measures the performance of the object device 1 by testing the test items according to the selection, the priority and the cycle set up through the measuring option setup field 65.

The measuring option set up window 60 further comprises a start button 67 to start the performance measurement for the object device 1. When a user clicks the start button 67, the performance test program controls the object device 1 and the measuring device 2 to be operated based on the data inputted through the coordinate-system setup window 50 and the measuring option setup window 60, and tests the performance of the object device 1 based on the measured data transmitted from the measuring device 2. Further, the performance test program stores the measured data transmitted from the measuring device 2 into the directory specified through the directory specifying field 43 (shown in FIG. 8) as a predetermined file.

Hereinbelow, a report window to report the performance measurement based on various report data inputted by a user and the measured data transmitted from the measuring device 2 will be described in reference to FIG. 2 and FIGS. 11–15.

The report window comprises a report main window 70 having a plurality of report selection menus 71, and a report displaying window 80 to be accessed according to the selected report selection menu 71.

Figure 11:
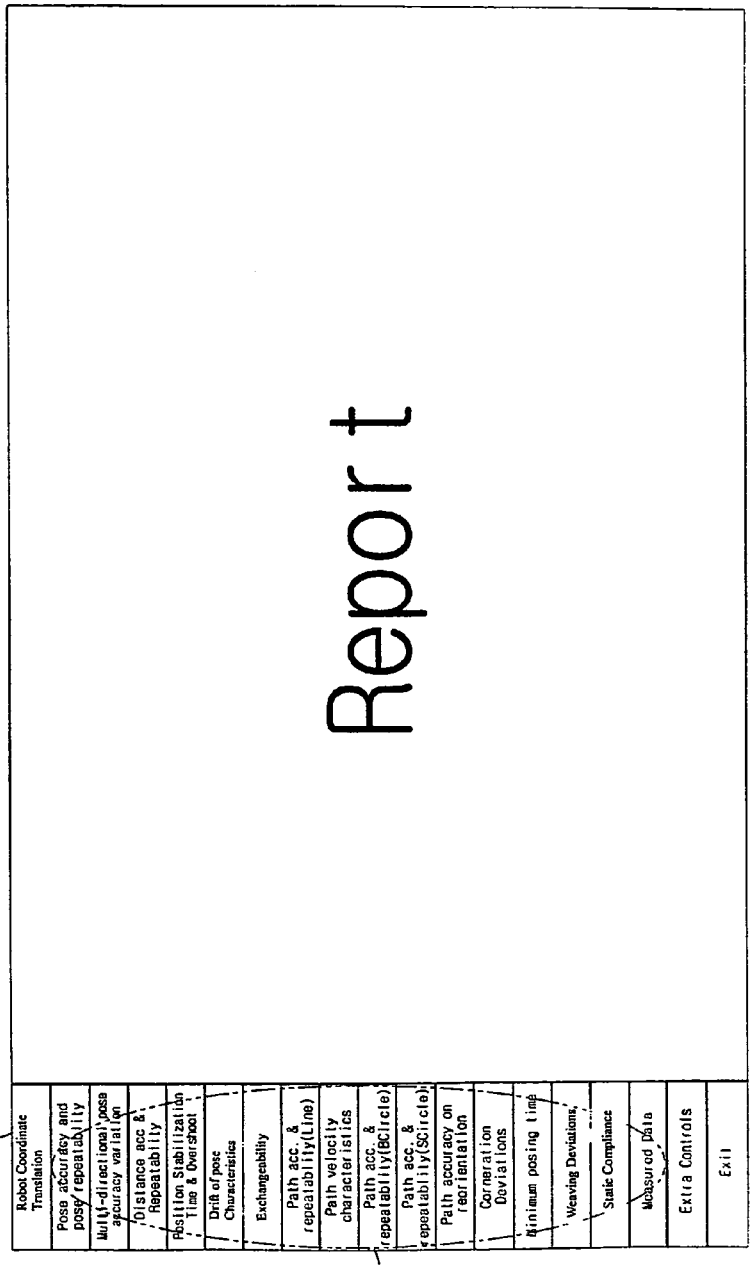
FIG. 11 illustrates a report main window according to an embodiment of the present invention.

First, when a user clicks the report menu 13 in the performance test main window 10 shown in FIG. 2, the report main window 70 is displayed as shown in FIG. 11. The plurality of report selection menus 71 provided in the report main window 70 are activated corresponding to the measured test items. Then, when one of the report selection menus 71 is clicked, the performance test program accesses the report displaying window 80 reflecting the measured data of the test item corresponding to the selected report menu 71.

Figure 12:
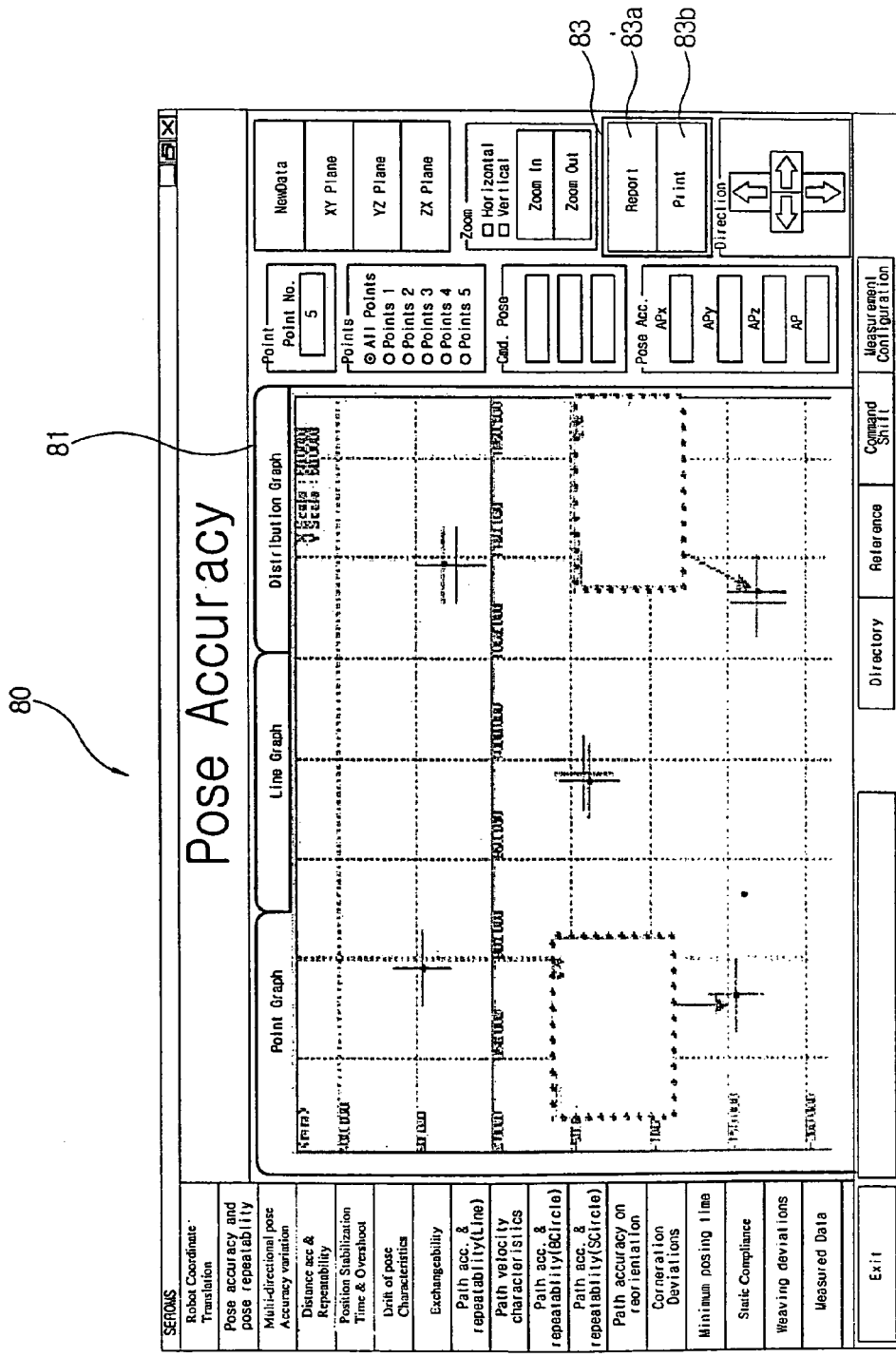
FIG. 12 illustrates a report displaying window according to an embodiment of the present invention.

FIG. 12 illustrates the report displaying window 80 according to the present invention by way of example. As shown therein, the report displaying window 80 comprises a report display field 81 displaying the processed measured data to allow a user to check the performance of the object device 1 in terms of the selected test item. Here, the report display field 81 displays various graphs such as a point graph, a line graph, a bar graph, a circular graph, etc. or a data sheet reflecting the measured data.

Further, the report displaying window 80 comprises an output field 83 having a report button 83a and a print button 83b. The print button 83b allows a user to print the measurement report reflecting the report data inputted through the report setup window 40 and the measured data transmitted from the measuring device 2 through a printer. FIGS. 13 and 14 exemplarily illustrate the measurement reports printed by the performance test program according to the present invention. As shown therein, the report data inputted through the report setup window 40 and the measured data transmitted from the measuring device 2 are processed and outputted together, and therefore, it is unnecessary for a user to report the performance measurement reflecting the report data and the measured data separately.

Figure 15:
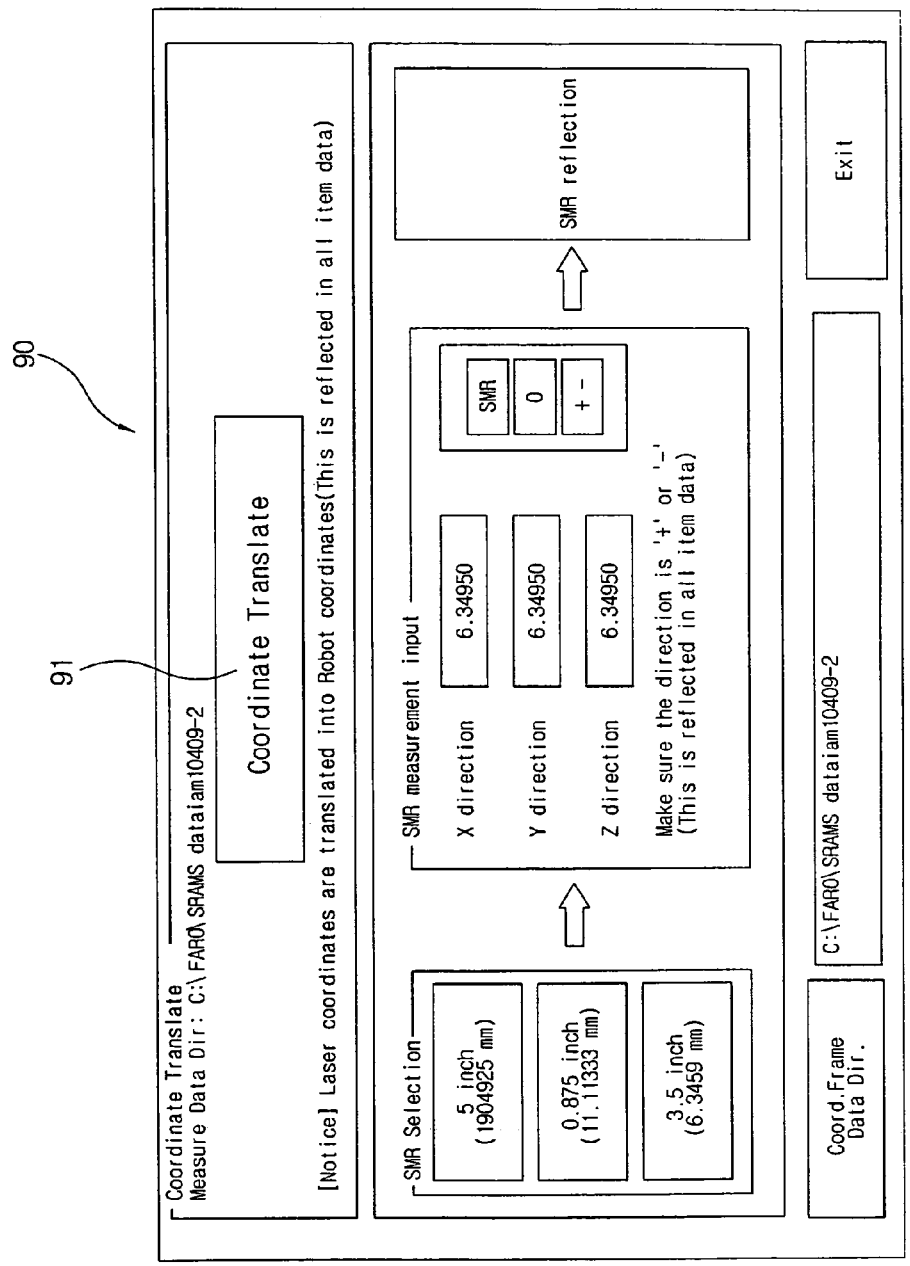
FIG. 15 illustrates a coordinate translation window according to an embodiment of the present invention.

In FIG. 11, the report main window 70 comprises a coordinate translation menu 73. When a user selects the coordinate translation menu 73, the performance test program accesses a coordinate translation window 90 as shown in FIG. 15. The coordinate translation window 90 comprises a coordinate translation button 91 to translate the measured data transmitted from the measuring device 2 into the coordinate values corresponding to the coordinate system based on the object device 1 set up through the coordinate-system setup window 50. Thus, when a user selects the coordinate translation button 91, the measured data transmitted from the measuring device 2 is translated into the coordinate values corresponding to the coordinate system based on the object device 1, and then displayed onto the report display field 81 of the report displaying window 80 and onto the measured data of the measurement report.

In the above described embodiments and drawings, the buttons, the boxes, etc. provided in the respective windows have shapes and arrangement, by way of example. Therefore, it should be appreciated that changes may be made in these embodiments without departing from the principles and spirit of the invention.

According to the present invention, there is provided a computing device having a controller, the controller comprising a performance test program, displaying the report setup window through which data to be reflected in the measurement report is inputted, the coordinate-system setup window through which the coordinate system is set up based on the object device, and the measuring option setup window through which options for measuring the performance of the object device is set up, controlling an operation of the measuring device and the object device based on the options set up through the measuring option setup window, and testing the performance of the object device on the basis of the measured data transmitted from the measuring device according to the operation of the object device and the measuring device, and displaying a report displaying window to process and to output report data inputted through the report setup window and the measured data transmitted from the measuring device, to measure the performance of the object device, the performance measurement is reported with measured data and various report data, and the interface convenient for a user is provided.

As described above, the present invention provides a performance measurement system, in which performance of an object device is measured, the performance measurement is reported with measured data and various report data, and an interface convenient for a user is provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A performance test system comprising:
    a measuring device to measure an object device; and
    a computing device having a controller to test performance of the object device on the basis of measured data transmitted from the measuring device;
    wherein the controller
        controls to display a report setup window through which data to be reflected in a measurement report is inputted, a coordinate-system setup window through which a coordinate system is set up based on the object device, and a measuring option setup window through which options for measuring the performance of the object device are set up,
        controls operation of the measuring device and the object device based on the options set up through the measuring option setup window, and tests the performance of the object device based on the measured data transmitted from the measuring device according to the operation of the object device and the measuring device, and
        controls to display a report window to process and to output report data inputted through the report setup window and the measured data transmitted from the measuring device.

2. The performance test system of claim 1, wherein the controller controls to display a device registration window through which information on the object device is inputted.

3. The performance test system of claim 2, wherein the device registration window comprises:
    a configuration window through which configuration information including types and model names of the object device is registered; and
    a specification window through which specification information according to the types and the model names of the object device based on the configuration information of the object device is registered.

4. The performance test system of claim 3, wherein the configuration window comprises a selection field having a plurality of selection buttons, and data input sheets displayed when the selection button is clicked.

5. The performance test system of claim 3, wherein the specification window comprises:

a device selection field having a type selection combo box through which one of the types of the objective device registered through the configuration window is selected, and a model selection combo box through which the model names of the object device registered through the configuration window is selected; and a specification registration field having at least one test item selection button corresponding to test items, and a specification input box being displayed when the test item selection button is selected and through which the specification information on the test item corresponding to the selected test item selection button is inputted.

6. The performance test system of claim 2, wherein the controller controls the measuring device to obtain coordinate values corresponding to first, second and third points to define a seating plane on which the object device is located, and to obtain coordinate values to set up the coordinate system based on the object device.

7. The performance test system of claim 6, wherein the coordinate-system setup window comprises:
   a coordinate-system setup field having first, second and third point option buttons corresponding to the respective first, second and third points; and
   a measure button to issue a control command to the measuring device to obtain the coordinate value of the point corresponding to a selected one of the first, second and third point option buttons.

8. The performance test system of claim 7, wherein the coordinate-system setup field further comprises:
   coordinate-system setup option buttons corresponding to coordinate values to set up the coordinate system based on the object device; and
   coordinate input boxes corresponding to the respective coordinate-system setup option buttons through which the coordinate values based on the object device are inputted, wherein the controller controls the measuring device to obtain a coordinate value of a point corresponding to the selected coordinate-system setup option button when a user selects one of the coordinate-system setup option buttons and clicks the measure button.

9. The performance test system of claim 8, wherein the controller sets up the coordinate system based on the object device on the basis of the coordinate values inputted through the coordinate input boxes and the coordinate values obtained to define the coordinate system based on the object device.

10. The performance test system of claim 9, wherein the coordinate-system setup window further comprises a coordinate display field having a first display sheet to display the coordinate values controlled through the coordinate-system setup field and inputted from the measuring device as the coordinate values corresponding to the coordinate system based on the measuring device, and a second display sheet to display the coordinate values displayed on the first display sheet as the coordinate values corresponding to the coordinate system based on the object device.

11. The performance test system of claim 10, wherein the coordinate-system setup window further comprises:
   a rotation translation field having an axis selection button to select an axis about which the coordinate system is rotated; and
   a rotation angle input box through which a rotation angle is inputted, wherein the controller rotates the coordinate system set up through the coordinate-system setup field about an axis selected through the axis selection button axis at an angle inputted through the rotation angle input box.

12. The performance test system of claim 1, wherein the measuring option setup window comprises:
   a network setup field to set up a network between the computing device and the object device;
   a device configuration setup field to set up an operating configuration of the object device reflected in the performance measurement of the object device; and
   a measuring option setup field including a test item check box corresponding to at least one of test items, a measuring sequence input box to prioritize the test items checked through the test item check box, and a measuring cycle input box to input the number of measuring times for the test items checked through the test item check box.

13. The performance test system of claim 1, wherein the report setup window comprises:
   a report main window having a report selection menu corresponding to at least one test item; and
   a plurality of report displaying windows to be accessed based on the selected report selection menu.

14. The performance test system of claim 13, wherein the report main window comprises a coordinate translation menu to access a coordinate translation window,
   the coordinate translation window having a coordinate translation button to translate the measured data transmitted from the measuring device into the coordinate values corresponding to the coordinate system based on the object device set up through the coordinate-system setup window.

15. The performance test system of claim 13, wherein each of the report displaying windows comprises:
   a report display field processing and displaying the measured data transmitted from the measuring device; and
   an output field having a print button to print the measurement report reflecting the report data inputted through the report setup window and the measured data transmitted from the measuring device, and a storing button to store the report data inputted through the report setup window and the measured data transmitted from the measuring device as a predetermined file.

16. The performance test system of claim 1, wherein the controller comprises a performance test program based on an operating system of the computing device.

17. The performance test system of claim 5, wherein the test items comprise at least one of "pose accuracy and repeatability", "multi-directional pose accuracy", "distance accuracy and repeatability", "pose stabilization time and over shoot", "exchangeability", "path accuracy and repeatability", "path velocity characteristics", "circular path accuracy and repeatability", "path accuracy on reorientation", "cornering deviations", and "minimum posing time".

18. The performance test system of claim 5, wherein the specification window further comprises a display sheet on which previously registered specification information on the model name of the object device is shown, to prevent duplicate registration of the specification information corresponding to the same model name.

19. A performance measurement system of an object device, comprising:
   a measuring device to measure a performance of the object device;
   a computing device which controls an operation of the measuring device and comprises a controller to test and to report the performance of the object device based on the measured data received from the measuring device, simultaneously;
a display electrically connected to the computing device and displaying a picture; and
a user input part through which a user inputs test and report data corresponding to the performance of the object device,
wherein the measuring device obtains coordinate values corresponding to a specific point or movement of the object device and transmits the coordinate values to the computing device.

20. The performance measurement system of claim 19, wherein the computing device stores, computes and processes the test and report data inputted through the user input part and the measured data received from the measuring device, to test the performance of the object device.

21. The performance measurement system of claim 19, wherein the controller comprises a performance test program based on an operating system of the computing device.

22. The performance measurement system of claim 21, wherein the performance test program comprises a performance test main window to be displayed on the display, wherein the performance test main window comprises:
a device registration window through which information on the object device is inputted;
a system setup button to access the device registration window;
a measurement menu to access windows for measuring performance of the object device; and
a report menu to access a report window on which the performance measurement of the object device is to be reported.

23. The performance measurement system of claim 22, wherein the performance test main window further comprises:
an archive menu to access data corresponding to the performance measurement; and
an exit menu to exit from the performance test program.

24. The performance measurement system of claim 22, wherein when the system setup button is clicked, the performance test program allows the device registration window through which the information on the object device is inputted to be displayed on the display.

25. The performance measurement system of claim 24, wherein the device registration window comprises:
a configuration window through which configuration information including types and model names of the object device is registered; and
a specification window through which specification information according to the types and the model names of the object device based on the configuration information of the object device is registered.

26. The performance measurement system of claim 25, wherein the configuration window comprises a selection field having a plurality of selection buttons, and data input sheets displayed when the selection button is clicked.

27. The performance measurement system of claim 26, wherein the plurality of selection buttons comprise:
a model registration button to allow a user to input a model name and a model number of the object device;
a test item button, wherein the data input sheet showing test items for the object device are displayed;
an internet protocol address button to show input lines for the model names and an internet protocol address of the object device; and
an internet protocol port button inputting an internet protocol port.

28. The performance measurement system of claim 25, wherein the specification window comprises:
a device selection field having a type selection combo box through which one of the types of the objective device registered through the configuration window is selected, and a model selection combo box through which the model names of the object device registered through the configuration window is selected; and
a specification registration field having at least one test item selection button corresponding to test items, and a specification input box being displayed when the test item selection button is selected and through which the specification information on the test item corresponding to the selected test item selection button is inputted.

29. The performance measurement system of claim 28, wherein the specification window further comprises a display sheet on which previously registered specification information on the model name of the object device is shown, to prevent duplicate registration of the specification information corresponding to the same model name.

30. The performance measurement system of claim 22, wherein the measurement menu comprises:
a report setup window through which data to report the measurement is inputted;
a coordinate-system setup window through which a coordinate system is set up based on the object device; and
a measuring option setup window through which options for measuring the performance of the object device are set up.

31. The performance measurement system of claim 19, wherein the controller controls the measuring device to obtain the coordinate values corresponding to first, second and third points to define a seating plane on which the object device is located, and to obtain coordinate values to set up the coordinate system based on the object device.

32. The performance measurement system of claim 30, wherein the coordinate-system setup window comprises:
a coordinate-system setup field having first, second and third point option buttons corresponding to the respective first, second and third points; and
a measure button to issue a control command to the measuring device to obtain the coordinate values of points corresponding to the first, second and third point option buttons.

33. The performance measurement system of claim 32, wherein the coordinate-system setup field further comprises:
coordinate-system setup option buttons corresponding to coordinate values to set up the coordinate system based on the object device; and
coordinate input boxes corresponding to the respective coordinate-system setup option buttons through which the coordinate values based on the object device are inputted, wherein the controller controls the measuring device to obtain a coordinate value of a point corresponding to the selected coordinate-system setup option button when a user selects one of the coordinate-system setup option buttons and clicks the measure button.

34. The performance measurement system of claim 33, wherein a relative position between the coordinate values based on the object device and the coordinate values based on the measuring device is obtained to set up a coordinate system based on the object device.

35. The performance measurement system of claim 31, wherein a degree of the measured seating plane of the object device defined based on the coordinate values is parallel with a predetermined reference plane.

36. The performance measurement system of claim 35, wherein the measured seating plane is inclined relative to the predetermined reference plane at a predetermined angle and the predetermined angle is reflected in the measured data of the object device based on the coordinate values obtained by the measuring device.

* * * * *

UNITED STATES PATENT AND TRADEMARK OFFICE
CERTIFICATE OF CORRECTION

PATENT NO. : 7,050,937 B2 Page 1 of 1
APPLICATION NO. : 10/791808
DATED : May 23, 2006
INVENTOR(S) : Sang-In Lee It is certified that error appears in the above-identified patent and that said Letters Patent is hereby corrected as shown below:

Column 13, line 59 change "comprise:" to --comprises:--

Signed and Sealed this

Seventeenth Day of October, 2006

JON W. DUDAS
*Director of the United States Patent and Trademark Office*